US011028882B2

(12) United States Patent
Roman

(10) Patent No.: US 11,028,882 B2
(45) Date of Patent: Jun. 8, 2021

(54) METHODS AND APPARATUS FOR A ROLLING BEARING ASSEMBLY WITH ELECTRICAL DISCHARGE DAMAGE PROTECTION

(71) Applicant: Illinois Tool Works Inc., Glenview, IL (US)

(72) Inventor: Matthew Roman, Mechanic Falls, ME (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/558,923

(22) Filed: Sep. 3, 2019

(65) Prior Publication Data
US 2020/0072289 A1 Mar. 5, 2020

Related U.S. Application Data

(60) Provisional application No. 62/726,897, filed on Sep. 4, 2018.

(51) Int. Cl.
*H01R 39/00* (2006.01)
*F16C 41/00* (2006.01)
(Continued)

(52) U.S. Cl.
CPC ............ *F16C 41/002* (2013.01); *F16C 19/52* (2013.01); *F16C 33/7816* (2013.01); *F16C 33/7853* (2013.01); *F16C 2202/32* (2013.01)

(58) Field of Classification Search
CPC ................ F16C 41/002; F16C 33/7816; F16C 33/7853; F16C 19/52; F16C 2202/32; F16C 33/7856; F16C 19/06
(Continued)

(56) References Cited

U.S. PATENT DOCUMENTS

| 822,723 A | 6/1906 | Conrad | |
|---|---|---|---|
| 9,175,728 B2 * | 11/2015 | White | F16C 33/7843 |

(Continued)

FOREIGN PATENT DOCUMENTS

| DE | 102017106695 | 4/2018 |
|---|---|---|
| JP | 2009079643 | 4/2009 |
| WO | 2009056098 | 5/2009 |

OTHER PUBLICATIONS

Int'l Search Report and Written Opinion Appln No. PCT/US2019/049521 dated Apr. 15, 2020.
(Continued)

*Primary Examiner* — Abdullah A Riyami
*Assistant Examiner* — Nelson R. Burgos-Guntin
(74) *Attorney, Agent, or Firm* — McAndrews, Held & Malloy, Ltd.

(57) ABSTRACT

Provided is disclosure for an example providing protection from electrical discharges for a rolling bearing assembly, where the rolling bearing assembly comprises an inner ring with an inner ring raceway, an outer ring with an outer ring raceway, rolling elements configured to roll or rotate between the inner ring raceway and the outer ring raceway, and at least one electrically conductive part with a first end and a second end, where the first end is configured to electrically contact the inner ring and the second end is configured to electrically contact the outer ring.

20 Claims, 6 Drawing Sheets

(51) Int. Cl.
*F16C 19/52* (2006.01)
*F16C 33/78* (2006.01)

(58) Field of Classification Search
USPC .................................................. 439/10, 11, 13
See application file for complete search history.

(56) References Cited

U.S. PATENT DOCUMENTS

| | | |
|---|---|---|
| 9,464,672 B2 | 10/2016 | White |
| 9,790,995 B2 | 10/2017 | White |
| 10,190,640 B2 | 1/2019 | Hutchison |
| 10,253,815 B2 | 4/2019 | Hart |
| 10,578,164 B1 * | 3/2020 | Zhong ..................... F16C 19/52 |
| 2014/0334758 A1 | 11/2014 | White |
| 2016/0312834 A1 | 10/2016 | White |
| 2017/0108047 A1 | 4/2017 | White |
| 2019/0226526 A1 * | 7/2019 | Hubert ..................... F16C 19/52 |
| 2019/0301435 A1 * | 10/2019 | Sorensen .................. F03D 9/25 |
| 2020/0072288 A1 * | 3/2020 | Roman ................. F16C 41/002 |
| 2020/0080597 A1 * | 3/2020 | White ...................... H01R 4/64 |

OTHER PUBLICATIONS

International Preliminary Report on Patentability in Application No. PCT/US2019/049521, dated Mar. 18, 2021 (8 pages).

* cited by examiner

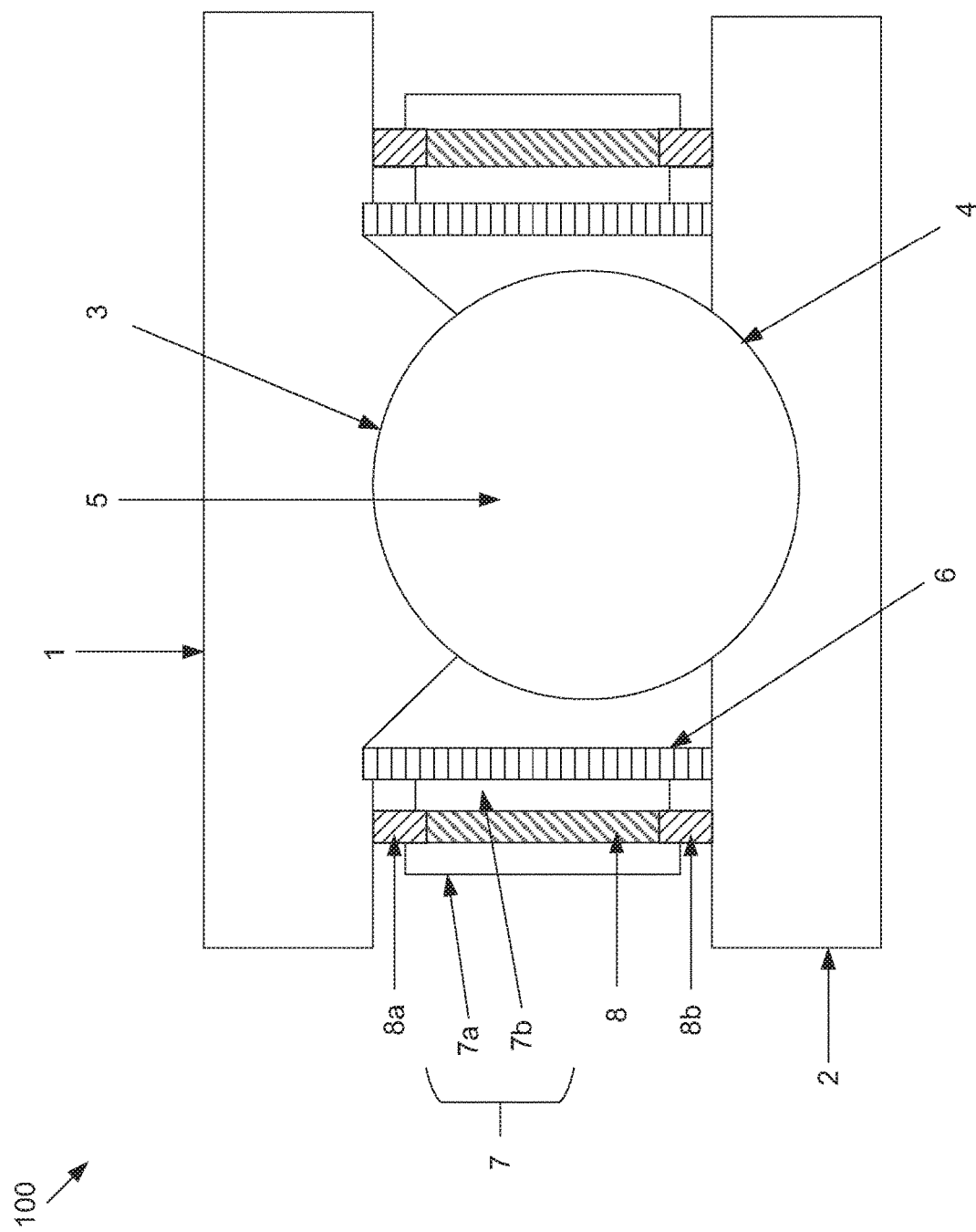

METHODS AND APPARATUS FOR A ROLLING BEARING ASSEMBLY WITH ELECTRICAL DISCHARGE DAMAGE PROTECTION

CLAIM OF PRIORITY

This patent application makes reference to, claims priority to and claims benefit from U.S. Provisional Patent Application Ser. No. 62/726,897, filed on Sep. 4, 2018. The above identified application is hereby incorporated herein by reference in its entirety.

BACKGROUND

The present disclosure relates to electrical discharge damage remediation, and more particularly, to methods and apparatus for a rolling bearing assembly with electrical discharge damage protection.

Limitations and disadvantages of conventional approaches will become apparent to one of skill in the art, through comparison of such approaches with some aspects of the present methods and system set forth in the remainder of this disclosure with reference to the drawings.

SUMMARY

Methods and systems are provided for a rolling bearing assembly with electrical discharge damage protection, substantially as illustrated by and described in connection with at least one of the figures, as set forth more completely in the claims.

BRIEF DESCRIPTION OF THE DRAWINGS

These and/or other aspects will become apparent and more readily appreciated from the following description of the exemplary embodiments, taken in conjunction with the accompanying drawings.

FIG. 2A illustrates a cross-section view of another example rolling bearing assembly with electrical discharge damage protection, in accordance with aspects of this disclosure.

DETAILED DESCRIPTION

Generally, a rolling bearing assembly may be used to allow smoother rotations of a rotor in, for example, an electric motor. However, voltages may be created on motor shafts, and the built-up voltage can discharge through the bearings. Discharging of the voltage can damage the rolling bearings such that, over time, the rolling bearing assembly will need to be replaced for continued operation of the motor.

Various examples of the disclosure describe a rolling bearing assembly with electrical discharge damage protection.

Figure 1:
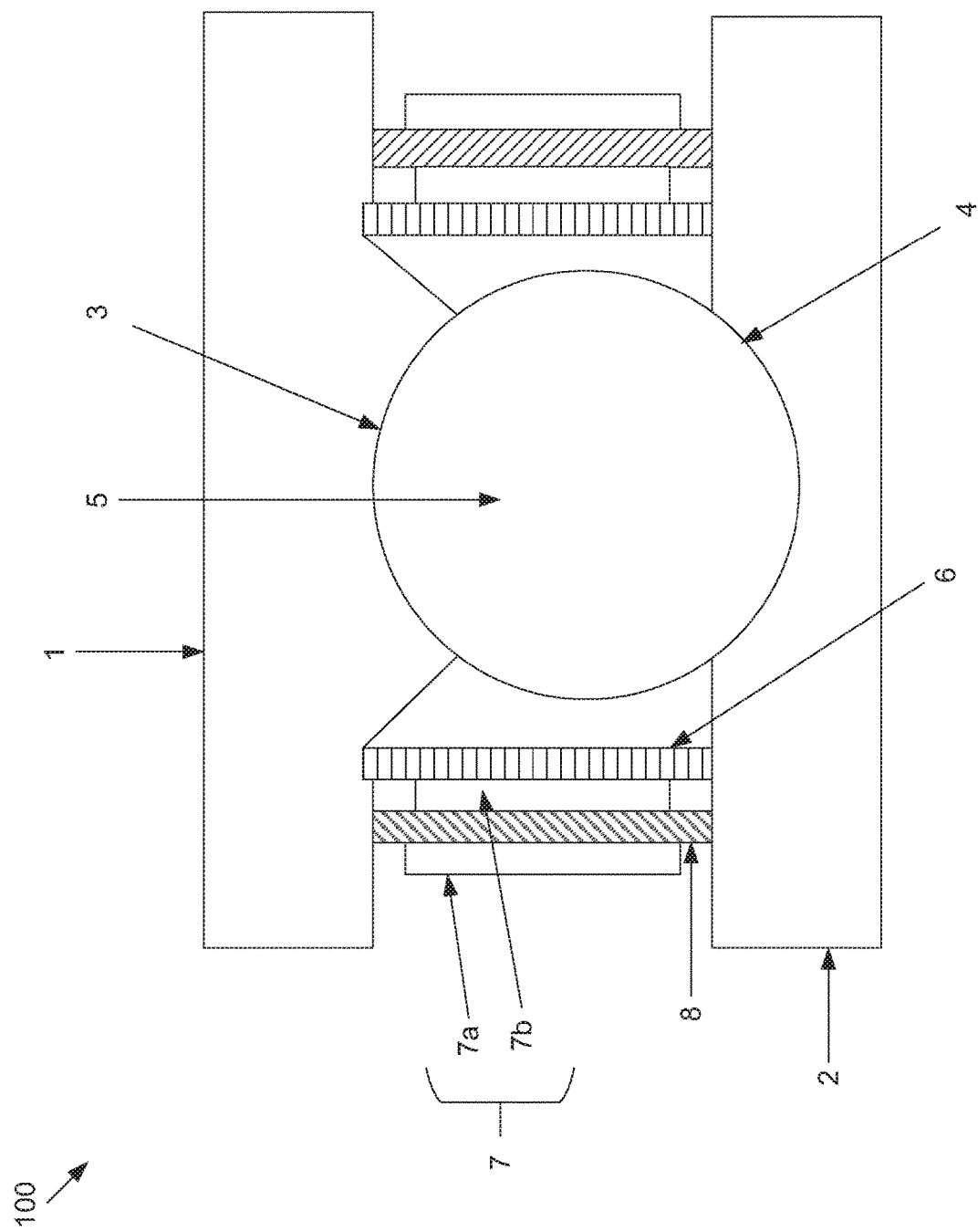
FIG. 1 illustrates a cross-section view of an example rolling bearing assembly with electrical discharge damage protection, in accordance with aspects of this disclosure.

In FIG. 1, there is shown a cross-section of a rolling bearing assembly 100 that is generally circular (or ring shaped). The cross-section view is of the top of the circular rolling bearing assembly 100. Accordingly, a shaft (not shown) extending horizontally across the page may be below the shown cross-section. A similar cross-section (not shown) of the bottom of the circular rolling bearing assembly 100 would be below the shaft. Therefore, if the shaft and the bottom cross-section are included in the drawing, a top of the shaft is in contact with the inner ring 2 of the shown cross-section of the top part and the bottom of the shaft is in contact with inner ring 2 of the cross-section of the bottom part. Note that the inner ring of the bottom part would be above the outer ring of the bottom part. Therefore, the shaft would be encircled by the inner ring 2.

A rolling bearing assembly 100 with electrical discharge damage protection comprises an inner ring 2 and an outer ring 1, where the inner ring 2 includes an inner ring raceway 4 and the outer ring 1 includes an outer ring raceway 3. The rolling bearing assembly 100 includes a plurality of rolling elements 5, where the plurality of rolling elements 5 are supported to roll on the inner ring raceway 4 and/or the inner ring raceway 3. At times the rolling elements 5 may contact both the inner ring raceway 4 and the outer ring raceway 3. At other times the rolling elements 5 may contact only one of the inner ring raceway 4 or the outer ring raceway 3. This may depend, for example, on the load and the location of the load on the rolling bearing assembly 100. The rolling elements 5 may be of different appropriate shapes for different example rolling bearing assembly 100. For example, the rolling bearing elements 5 may be spherical, cylindrical, or other appropriate shapes.

The rolling bearing assembly 100 may further include at least one ring 7 that does not directly contact either of the inner ring 2 or the outer ring 1. The at least one ring 7 may be electrically conductive or not. The at least one ring 7 may comprise, for example, a first ring 7a and a second ring 7b. An electrically conductive part 8 may be fixed to at least one of the first ring 7a and/or the second ring 7b, where the electrically conductive part 8 contacts the inner ring 2 and the outer ring 1. The electrically conductive part 8 may comprise, for example, filaments. While the term "filaments" is used for ease of application, it should be understood that "filaments" may refer to a single filament or multiple filaments.

As shown in FIG. 2A, an example of the disclosure may have the electrically conductive part 8 with end pieces 8a and/or 8b that are filaments. The electrically conductive part 8 may be coupled to the ring 7 via a bracket (or cap) 9 as shown in FIGS. 3A and 3B. The end pieces 8a and 8b may be attached to the electrically conductive part 8 via a cap 10 as shown in FIG. 3C, screwed in, or via any other method appropriate for attaching the end pieces 8a and 8b to the electrically conductive part 8.

The rolling bearing assembly 100 may also include a seal 6 that is integrally connected to the at least one ring 7 that may contact the inner ring 2 and/or outer ring 1. FIGS. 1 and 2 show one seal 6 coupled to only one side of the ring 7b. However, various examples of the disclosure may allow a plurality of seals 6, with one or more seals 6 coupled to one or both sides of the ring 7. The seal 6 are shown to be between the electrically conductive part 8 and the rolling elements 5. In FIGS. 1 and 2, the seal 6 is shown to be between the rolling elements 5 and the second ring 7b of the ring 7.

As shown, in FIGS. 1 and 2 there is an electrical path between the inner ring 2 and the outer ring 1 such that voltage at the motor shaft can be dissipated without damaging the rolling elements 5.

The electrically conductive part 8 may be fastened (or coupled, attached, etc.) to the ring 7 by one or many methods that are suitable for such a purpose. For example, the electrically conductive part 8 may be fastened to one or both of the first ring 7a and the second ring 7b by using an adhesive.

FIGS. 1 and 2 show the ring 7 on both sides of the rolling elements 5. However, other examples of the disclosure may have the ring 7 on only one side of the rolling elements 5. In some examples of the disclosure, the ring 7 may not be a ring.

Figure 5:
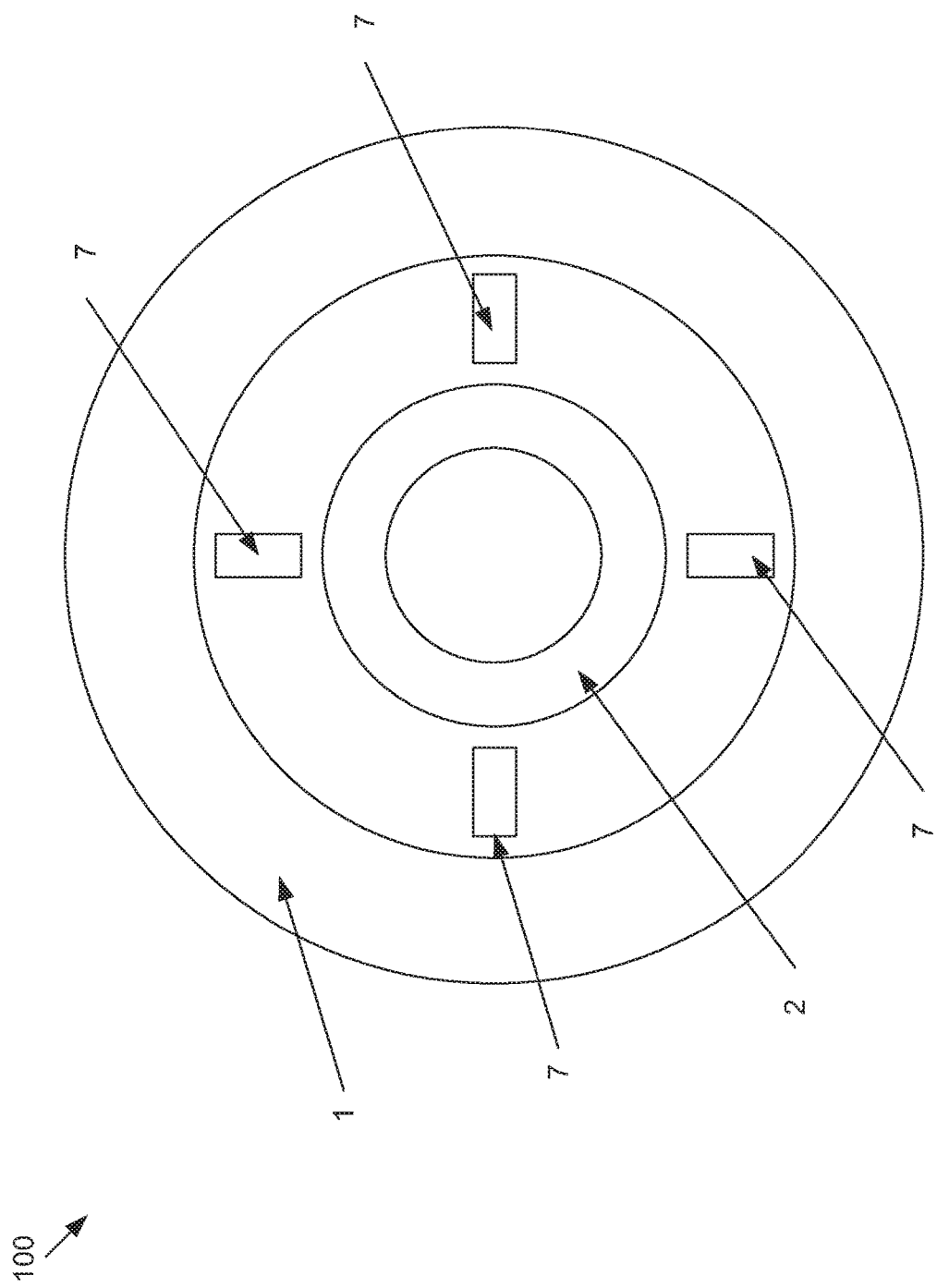
FIG. 5 illustrates a side view of a rolling bearing assembly with electrical discharge damage protection, in accordance with aspects of this disclosure.

For example, FIG. 5 illustrates a side view of the rolling bearing assembly 100. FIG. 5 shows the rolling bearing assembly 100 with the outer ring 1 and the inner ring 2, where the ring 7 comprises at least one discrete part between the inner ring 2 and the outer ring 1, and where the at least one discrete part is not a ring. For example, FIG. 5 shows 4 discrete electrically conductive parts 7 between the outer ring 1 and the inner ring 2 that do not touch either of the outer ring 1 or the inner ring 2. These discrete electrically conductive parts 7 may have similar accessory parts such as the corresponding seals 6 and electrically conductive part 8. These discrete electrically conductive parts 7 may also comprise a first ring 7a and a second ring 7b. The ring 7 of FIG. 5 may also be coupled to the electrically conductive part 8 and the seal 6 as described previously. It may be noted that the electrically conductive part 8 may also be discrete parts or a ring coupled to the discrete parts of the ring 7.

While four discrete electrically conductive parts of the ring 7 are shown, various examples of disclosure may have one or more electrically discrete conductive parts of the ring 7. Additionally, the shape of the discrete electrically conductive parts of the 7 may be different than the example of rectangles shown in FIG. 5.

Figure 2B:
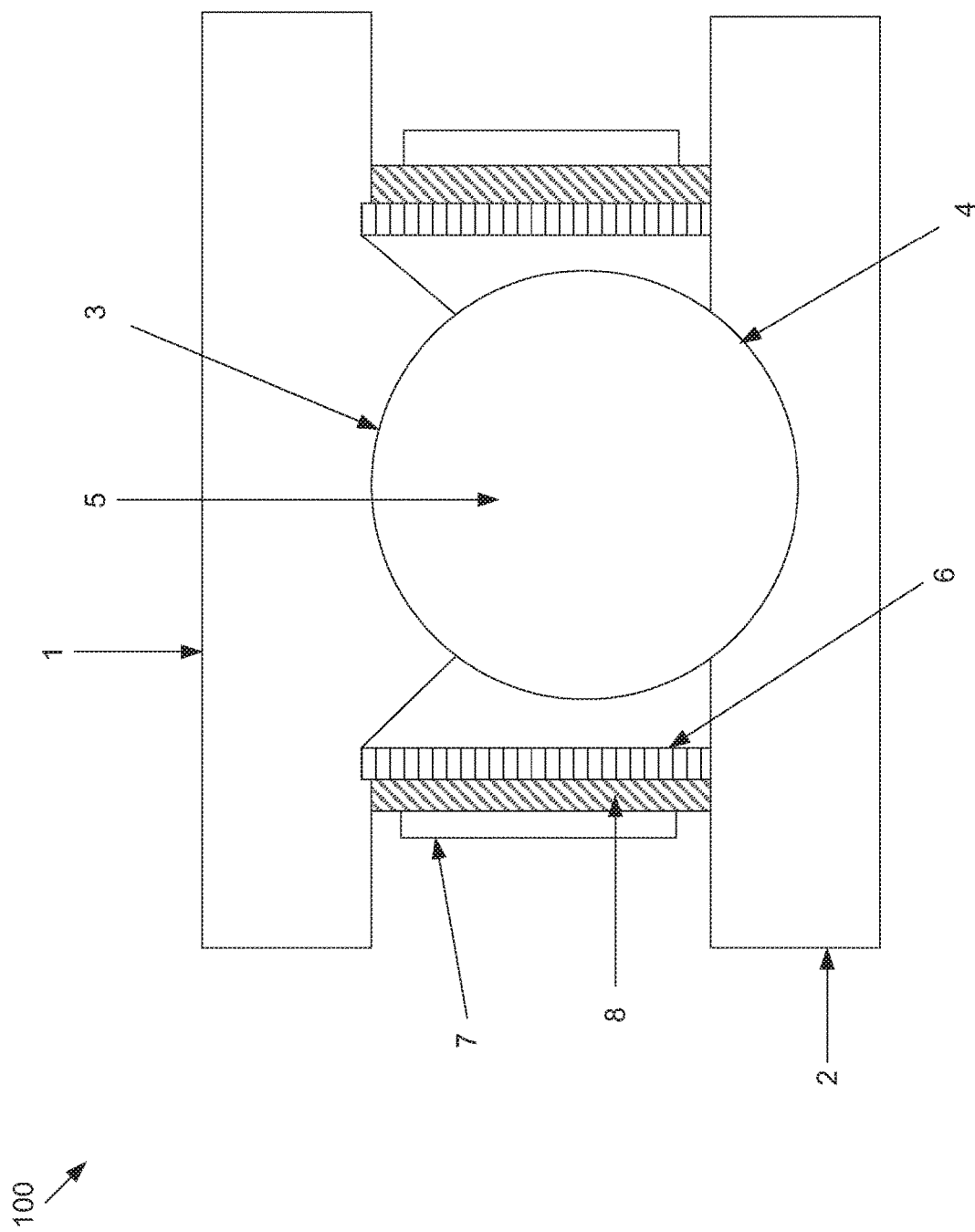
FIG. 2B illustrates a cross-section view of yet another example rolling bearing assembly with electrical discharge damage protection, in accordance with aspects of this disclosure.
Figure 3C:
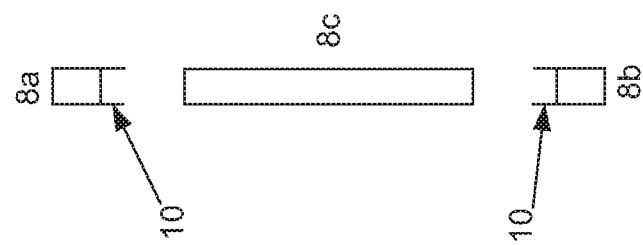
FIGS. 3A, 3B, and 3C illustrate example caps for coupling conductive brush filaments onto another part, in accordance with aspects of this disclosure.
Figure 3B:
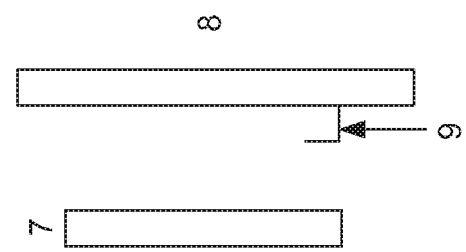
Figure 3A:
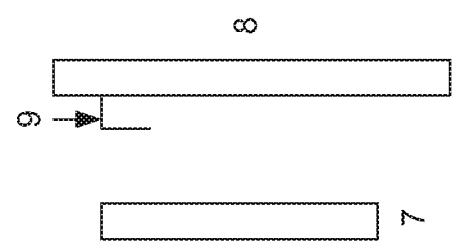

FIG. 2B is similar to FIG. 1 except that the seal 6 is next to the electrically conductive part 8 without a ring 7 in between. It can also be seen that another example of the disclosure can have the ring 7 between the seal 6 and the electrically conductive part 8 without another ring 7 on the other side of the electrically conductive part 8. Additionally, rather than have the ring 7 on both sides of the rolling elements 5, there may only be a single ring 7 on one side of the rolling elements 5.

FIGS. 3A and 3B illustrate a cap or bracket 9 that may be a part of the electrically conductive part 8. The cap 9 may fit over, for example, an end of the ring 7. Accordingly, the cap 9 may be configured such that the electrically conductive part 8 may be attached to either end or both ends of the first ring 7a or the second ring 7b. The cap 9 may also be used to couple to the first ring 7a and the second ring 7b. While it is referred to as a "cap," the cap 9 may also be a pin or a screw configured to fit into, for example, a hole at an end of the ring 7.

FIG. 3C illustrates a cap (or bracket) 10 that allows filaments 8a and 8b to fit on ends of the central part 8c. While referred to as the electrically conductive part 8, when fitted with the filaments 8a and 8b, the central part 8c need not be electrically conductive. Rather, the filaments 8a and 8b enable electrical conduction from the inner ring 2 to one of the filaments 8a or 8b to the ring 7 to the other of the filaments 8b or 8a to the outer ring 1. Similarly, when the electrically conductive part 8, without the filaments 8a and 8b, is made of conductive material, and/or when the central part 8c is conductive with the conductive filaments 8a and 8b, the ring 7 can be a non-conductive material. Whether the ring 7 is conductive or not, the ring 7 (whether one or more) may act as a brace for the electrically conducive part 8 and/or the seal 6.

Various items may be discussed as being "fastened," "attached," "fixed," or "coupled" to each other. This fixing/coupling may be permanently fixed or removably fixed. For example, permanently fixing/coupling two objects may be when separating the two objects is difficult or may result in one or both of the objects being damaged. Examples of permanently fixing may be adhesives that is not meant to be dissolved or loosened, mechanical fastening such as riveting, crimping, force fitting, welding, etc. Removably fixing/coupling may indicate that the two objects are intended to be taken apart such that they, or replacement parts, can be fixed/coupled again. For example, removably fixing/coupling may use adhesives that can be dissolved or loosened, or use mechanical fastening mechanisms such as screws, bolts, latches, hook and loop fasteners, etc. It may be noted that a fastening process may be considered to be permanent or removable depending on the amount of effort needed to remove and to couple.

Some examples of mechanical fastening, without regard to whether the fastening is removable or permanent, or whether any may apply to an example of the disclosure, may include crimping, staking, riveting, pressing (or interference fit), using screws/bolts, using hook and loop fasteners, latches, applying force by tension or compression, etc. or other technologies that may be useful in devices such as bearing assemblies described herein.

Figure 4C:
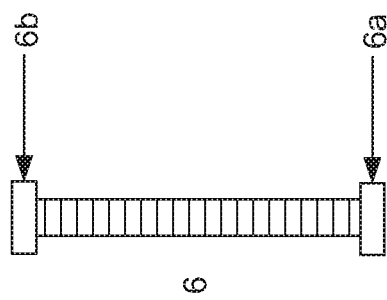
FIGS. 4A, 4B, and 4C illustrate example sealing lips, in accordance with aspects of this disclosure.
Figure 4B:
Figure 4A:
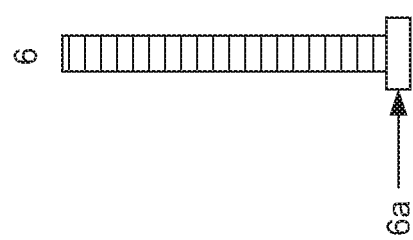

FIGS. 4A, 4B, and 4C provide illustrations of lips at one or both ends of the seal 6. In FIG. 4A, there is shown a lip 6a at a bottom end of the seal 6. In FIG. 4B, there is shown a lip 6b at a top end of the seal 6. In FIG. 4C, there are shown lips 6a and 6b at the bottom end of the seal 6 and the top end of the seal 6, respectively. The lips 6a and/or 6b may be flexible lips. The seal 6 may also be a flexible seal. In various aspects of the disclosure, the seal 6 may be made of similar material as the lips 6a, 6b or different material.

Therefore, it can be seen that the disclosure provides for a bearing assembly that comprises, for example, an inner ring with an inner ring raceway, an outer ring with an outer ring raceway, rolling elements configured to roll or rotate between the inner ring raceway and the outer ring raceway. The rolling elements may touch one or both of the inner ring raceway and the outer ring raceway at different times depending on loading on the bearing assembly at a specific time. The bearing assembly may also comprise at least one electrically conductive part with a first end and a second end, where the first end is configured to electrically contact the inner ring and the second end is configured to electrically contact the outer ring.

The bearing assembly may comprise first electrically conductive brush filaments coupled to the first end and second electrically conductive brush filaments coupled to the second end, where the first end is configured to electrically contact the inner ring via the first electrically conductive brush filaments and the second end is configured to electrically contact the outer ring via the second electrically conductive brush filaments. While "filaments" is used for ease of description, it should be understood that "filaments" is used in this disclosure can refer to a single filament or to multiple filaments.

The first electrically conductive brush filaments may be removably coupled to the first end, and the second electrically conductive brush filaments may be removably coupled to the second end. For example, the brush filaments may be held by a cap that fits over the first end or the second end. Or the brush filaments may be held by a holder such that the holder fits into a hole in the first end or the second end. Or the brush filaments may fit into the hole without a holder. Accordingly, it can be seen that the brush filaments may be removably coupled to the electrically conductive part. However, various aspects of the disclosure may also allow for permanently coupling the brush filaments to the electrically conductive part.

The at least one electrically conductive part comprises electrically conductive brush filaments, where a first end of the electrically conductive brush filaments is the first end of the electrically conductive part, and a second end of the electrically conductive brush filaments is the second end of the electrically conductive part. The at least one electrically conductive part may directly contact the inner ring and the outer ring.

The at least one electrically conductive part may be a seal. The seal comprises a surface that faces the rolling elements and a surface that faces away from the rolling elements. Where a portion near a first surface of the electrically conductive part facing away from the rolling elements comprises electrically conductive brush filaments. The seal may comprise a sealing lip that contacts one of the inner ring or the outer ring, and the sealing lip may be a flexible sealing lip.

As a bearing assembly generally has one of the inner ring or the outer ring stationary, and the other of the inner ring or the outer ring in motion, the sealing lip may contact the moving ring and the other end of the seal may be fixed to the corresponding ring. However, some aspects of the disclosure may allow both ends of a seal to be non-fixed.

The electrically conductive part may have a first electrically conductive part and a second electrically conductive part on opposite sides of the rolling elements, or the electrically conductive part may be on only one side of one of the rolling elements. In some aspects of the disclosure, the electrically conductive part may be a conductive ring between the inner ring and the outer ring, where the conductive ring may be continuous. In other aspects of the disclosure, the electrically conductive part may be discrete pieces that connect the inner ring to the outer ring. The discrete pieces may be thought of as pillars for ease of description, although various aspects of the disclosure may have different shapes, including arcs. It may also be noted that since the inner ring and the outer ring move with respect to each other, the electrically conductive part may have one end fixed to one of the inner ring or the outer ring, and the other end not fixed to the other of the inner ring or the outer ring.

Various aspects of the disclosure may also comprise a bearing assembly with an inner ring comprising an inner ring raceway, an outer ring comprising an outer ring raceway, and rolling elements configured to roll or rotate between the inner ring raceway and the outer ring raceway. The bearing assembly may also comprise at least one brace, and electrically conductive brush filaments, fastened to the at least one brace, with a first end and a second end. The at least one brace does not directly contact either of the inner ring or the outer ring, and the first end of the electrically conductive brush filament is configured to directly electrically contact the inner ring and the second end of the electrically conductive brush filaments is configured to directly electrically contact the outer ring.

The electrically conductive brush filaments may be fastened to the at least one brace with an adhesive or the electrically conductive brush filaments may be mechanically fastened to the at least one brace. The bearing assembly may also comprise a seal between the rolling elements and one or both of the at least one brace and electrically conductive brush filaments. The at least one brace may be a first brace between the electrically conductive brush filaments and the seal, where the seal is coupled to a side of the first brace that faces at least one of the rolling elements. The seal may have a sealing lip that contacts one of the inner ring or the outer ring, where the sealing lip may be flexible. The seal may directly touch both of the inner ring and the outer ring.

The seal, the at least one brace, and the electrically conductive brush filaments may be coupled together. Various aspects of the disclosure may be such that two or more of adjacent ones of the seal, the at least one brace, and the electrically conductive brush filaments are removably coupled together.

The at least one brace may comprise a first brace coupled to a first side of the electrically conductive brush filaments that faces at least one of the rolling elements and a second brace coupled to a second side of the electrically conductive brush filaments that faces away from at least one of the rolling elements. One or both of the first brace and the second brace may be removably coupled to the electrically conductive brush filaments.

The electrically conductive brush filaments comprise a first electrically conductive brush filaments and a second electrically conductive brush filaments on opposite sides of the rolling elements. Or, the electrically conductive brush filaments may be on only one side of one of the rolling elements.

The electrically conductive brush filaments is a conductive ring. The electrically conductive brush filaments comprise at least one discrete part that is not a ring. Similarly as described previously, the electrically conductive brush filaments may have a first electrically conductive brush filaments and a second electrically conductive brush filaments on opposite sides of the rolling elements, or the electrically conductive brush filaments may be on only one side of the rolling elements. In some aspects of the disclosure, the electrically conductive brush filaments may be a conductive ring between the inner ring and the outer ring, where the conductive ring may be continuous. In other aspects of the disclosure, the electrically conductive brush filaments may be discrete pieces that connect the inner ring to the outer ring. The discrete pieces may be thought of as pillars for ease of description, although various aspects of the disclosure may have different shapes, including arcs. It may also be noted that since the inner ring and the outer ring move with respect to each other, the electrically conductive brush filaments may have one end fixed to one of the inner ring or the outer ring, and the other end not fixed.

The disclosure may also provide for a rolling bearing assembly with electrical discharge damage protection that comprises an inner ring and an outer ring. The inner ring includes an inner ring raceway and the outer ring includes an outer ring raceway. A plurality of rolling elements may be supported to roll on the inner ring raceway and the inner ring raceway. A seal may extend radially between the outer ring and the inner ring, where the seal includes a fixed seal end that is fixed to one of the inner ring or the outer ring and a the other end that contacts the other one of the inner ring or outer ring, where the other end may be a flexible sealing lip.

The rolling bearing assembly may comprise at least one electrically conductive ring, and the seal may be integrally connected to the at least one electrically conductive ring. The at least one electrically conductive ring may have electrically conductive brush filaments fixed to at least one end. The electrically conductive brush filaments may electrically connect the inner ring and the outer ring to the electrically conductive ring.

As utilized herein, "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What are claimed:

1. A bearing assembly, comprising:
   an inner ring comprising an inner ring raceway;
   an outer ring comprising an outer ring raceway;
   rolling elements configured to roll or rotate between the inner ring raceway and the outer ring raceway;
   at least one electrically conductive part with a first end and a second end; and
   a seal between the at least one electrically conductive part and the rolling elements,
   wherein:
      the first end comprises first electrically conductive brush filaments configured to electrically contact the inner ring, and
      the second end comprises second electrically conductive brush filaments configured to electrically contact the outer ring.

2. The bearing assembly of claim 1, wherein:
   the first electrically conductive brush filaments are removably coupled to the first end, and
   the second electrically conductive brush filaments are removably coupled to the second end.

3. The bearing assembly of claim 1, wherein the seal comprises a sealing lip that contacts one of the inner ring or the outer ring.

4. The bearing assembly of claim 3, wherein the sealing lip is a flexible sealing lip.

5. The bearing assembly of claim 1, wherein the at least one electrically conductive part comprises at least one discrete part that is not a ring.

6. A bearing assembly, comprising:
   an inner ring comprising an inner ring raceway;
   an outer ring comprising an outer ring raceway;
   rolling elements configured to roll or rotate between the inner ring raceway and the outer ring raceway;
   at least one brace; and
   electrically conductive brush filaments, fastened to the at least one brace, with a first end and a second end,
   wherein:
      the at least one brace does not directly contact either of the inner ring or the outer ring, and
      the first end is configured to directly electrically contact the inner ring and the second end is configured to directly electrically contact the outer ring.

7. The bearing assembly of claim 6, comprising a seal between the rolling elements and one or both of the at least one brace and the electrically conductive brush filaments.

8. The bearing assembly of claim 7, wherein the seal comprises a sealing lip that contacts one of the inner ring or the outer ring.

9. The bearing assembly of claim 7, wherein the seal, the at least one brace, and the electrically conductive brush filaments are coupled together.

10. The bearing assembly of claim 7, wherein two or more of adjacent ones of the seal, the at least one brace, and the electrically conductive brush filaments are removably coupled together.

11. The bearing assembly of claim 6, wherein the electrically conductive brush filaments is on only one side of one of the rolling elements.

12. The bearing assembly of claim 6, wherein the electrically conductive brush filaments is a conductive ring.

13. The bearing assembly of claim 6, wherein the electrically conductive brush filaments comprise at least one discrete part that is not a ring.

14. A rolling bearing assembly with electrical discharge damage protection, comprising:
   an inner ring and an outer ring, the inner ring including an inner ring raceway and the outer ring including an outer ring raceway;
   a plurality of rolling elements, the plurality of rolling elements are supported to roll on the inner ring raceway and the inner ring raceway; and
   a seal extending radially between the outer ring and the inner ring, the seal including a fixed seal end that is fixed to one of the inner ring or the outer ring and a flexible sealing lip that contacts the other one of the inner ring or the outer ring.

15. The rolling bearing assembly of claim 14, comprising at least one electrically conductive ring.

16. The rolling bearing assembly of claim 15, wherein the seal is integrally connected to the at least one electrically conductive ring.

17. The rolling bearing assembly of claim 15, wherein the at least one electrically conductive ring has electrically conductive brush filaments fixed to at least one end.

18. The bearing assembly of claim 1, comprising at least one brace fastened to the at least one electrically conductive part.

19. The bearing assembly of claim 18, wherein the at least one brace does not directly contact either of the inner ring or the outer ring.

20. The bearing assembly of claim 18, comprising a seal between the rolling elements and one or both of the at least one brace and the electrically conductive part.

* * * * *